United States Patent
Liu et al.

(10) Patent No.: US 12,399,395 B2
(45) Date of Patent: Aug. 26, 2025

(54) DISPLAY DEVICE AND OPERATION METHOD FOR HEATING DISPLAY PANEL

(71) Applicant: Novatek Microelectronics Corp., Hsinchu (TW)

(72) Inventors: Hua-Wei Liu, New Taipei (TW); Chih-Chang Lai, Taichung (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/485,304

(22) Filed: Oct. 11, 2023

(65) Prior Publication Data

US 2025/0123512 A1    Apr. 17, 2025

(51) Int. Cl.
*G02F 1/1333* (2006.01)
*G09G 3/36* (2006.01)

(52) U.S. Cl.
CPC .... *G02F 1/133382* (2013.01); *G02F 1/13338* (2013.01); *G09G 3/3677* (2013.01); *G02F 2203/30* (2013.01); *G09G 3/3688* (2013.01); *G09G 2310/0202* (2013.01); *G09G 2310/027* (2013.01); *G09G 2310/08* (2013.01); *G09G 2320/041* (2013.01); *G09G 2354/00* (2013.01)

(58) Field of Classification Search
CPC .......... G02F 1/13338; G02F 1/133382; G02F 2203/30; G09G 3/3677; G09G 3/3688; G09G 2310/0202; G09G 2310/027; G09G 2310/08; G09G 2320/041; G09G 2354/00
See application file for complete search history.

(56) References Cited

U.S. PATENT DOCUMENTS

| | | | |
|---|---|---|---|
| 8,654,117 B2 | 2/2014 | Yanase et al. | |
| 9,176,338 B2 | 11/2015 | Yang et al. | |
| 9,470,933 B2 | 10/2016 | Yanase et al. | |
| 10,795,199 B2 | 10/2020 | Zhao et al. | |
| 2001/0043166 A1* | 11/2001 | Jacobsen | H04M 1/021 348/E5.143 |
| 2006/0071890 A1* | 4/2006 | Kikuchi | G09G 3/3677 345/87 |
| 2007/0018919 A1* | 1/2007 | Zavracky | G09G 3/3413 345/87 |

(Continued)

FOREIGN PATENT DOCUMENTS

| | | |
|---|---|---|
| CN | 101510020 | 9/2010 |
| CN | 103336593 | 10/2013 |

(Continued)

OTHER PUBLICATIONS

"Office Action of Taiwan Counterpart Application", issued on Aug. 8, 2024, p. 1-p. 4.

*Primary Examiner* — Stephen G Sherman
(74) *Attorney, Agent, or Firm* — JCIPRNET

(57) ABSTRACT

The disclosure provides a display device and an operation method thereof. The display device includes a display panel and a driving circuit. The display panel has at least one native conductive line for a display driving operation. The driving circuit is coupled to the at least one native conductive line. During a display driving period, the driving circuit performs the display driving operation on the display panel through the at least one native conductive line. During a heating period, the driving circuit performs a heating operation on the display panel through the at least one native conductive line.

4 Claims, 10 Drawing Sheets

(56) References Cited

U.S. PATENT DOCUMENTS

| | | | |
|---|---|---|---|
| 2007/0018923 A1* | 1/2007 | Yokota | G09G 3/3688 |
| | | | 345/89 |
| 2009/0256820 A1 | 10/2009 | Yanase et al. | |
| 2014/0132859 A1 | 5/2014 | Yanase et al. | |
| 2016/0291782 A1* | 10/2016 | Zhai | G06F 3/04164 |
| 2018/0240932 A1 | 8/2018 | Chen | |
| 2020/0058533 A1 | 2/2020 | Zou et al. | |
| 2021/0200354 A1* | 7/2021 | Kang | G06F 3/0416 |
| 2021/0383755 A1* | 12/2021 | Kawachi | G09G 3/3233 |
| 2023/0178411 A1 | 6/2023 | Zhao et al. | |

FOREIGN PATENT DOCUMENTS

| | | |
|---|---|---|
| CN | 106903978 | 1/2019 |
| TW | M595307 | 5/2020 |

* cited by examiner

DISPLAY DEVICE AND OPERATION METHOD FOR HEATING DISPLAY PANEL

BACKGROUND

Technical Field

The disclosure relates to an electronic device, and particularly relates to a display device and an operation method thereof.

Description of Related Art

The operating temperature range of a general liquid-crystal display (LCD) panel is approximately −20° C. to 70° C. At low temperatures (less than −20° C.), liquid crystals rotate very slowly. When the screen on the LCD panel starts to change, image retention appears on the screen due to the slow rotation speed of the liquid crystals. Therefore, how to heat the LCD panel in a low temperature environment is one of many technical issues in this field.

There are three existing LCD panel heating technologies. The first method is the plug-in type, that is, to use an additional heating equipment to increase the temperature of the LCD panel. The second method is to coat an additional metal heating layer on the upper layer of the LCD panel, and then use this additional metal heating layer to increase the temperature of the LCD panel. The third method is to use an extra metal conductive line as a heating conductive line in the LCD panel, and then use this extra metal conductive line to increase the temperature of the LCD panel. The above three methods all require additional design or modifying the original manufacturing operations, which increases the cost. In addition, if the LCD panel has a touch detection function, the first method and the second method may block the touch signal. The existing LCD panel heating technologies are not conducive to the current LCD in-cell touch panel.

SUMMARY

The disclosure provides a display device and an operation method thereof to heat a display panel.

In an embodiment of the disclosure, the display device includes the display panel and a driving circuit. The display panel has at least one native conductive line for a display driving operation. The driving circuit is coupled to the at least one native conductive line. During a display driving period, the driving circuit performs the display driving operation on the display panel through the at least one native conductive line. During a heating period, the driving circuit performs a heating operation on the display panel through the at least one native conductive line.

In an embodiment of the disclosure, the operation method includes the following. During a display driving period, a display driving operation is performed on a display panel by a driving circuit of a display device through at least one native conductive line of the display panel. During a heating period, a heating operation is performed on the display panel by the driving circuit through the at least one native conductive line.

Based on the above, the native conductive line according to the various embodiments is not merely configured to perform the display driving operation during the display driving period, but can also be configured to perform the heating operation during the heating period. Therefore, the display device can increase the temperature of the display panel without using an additional heating device.

In order to make the above-mentioned features and advantages of the disclosure more comprehensible, the embodiments are described in detail below with the accompanying drawings.

DESCRIPTION OF THE EMBODIMENTS

Figure 1:
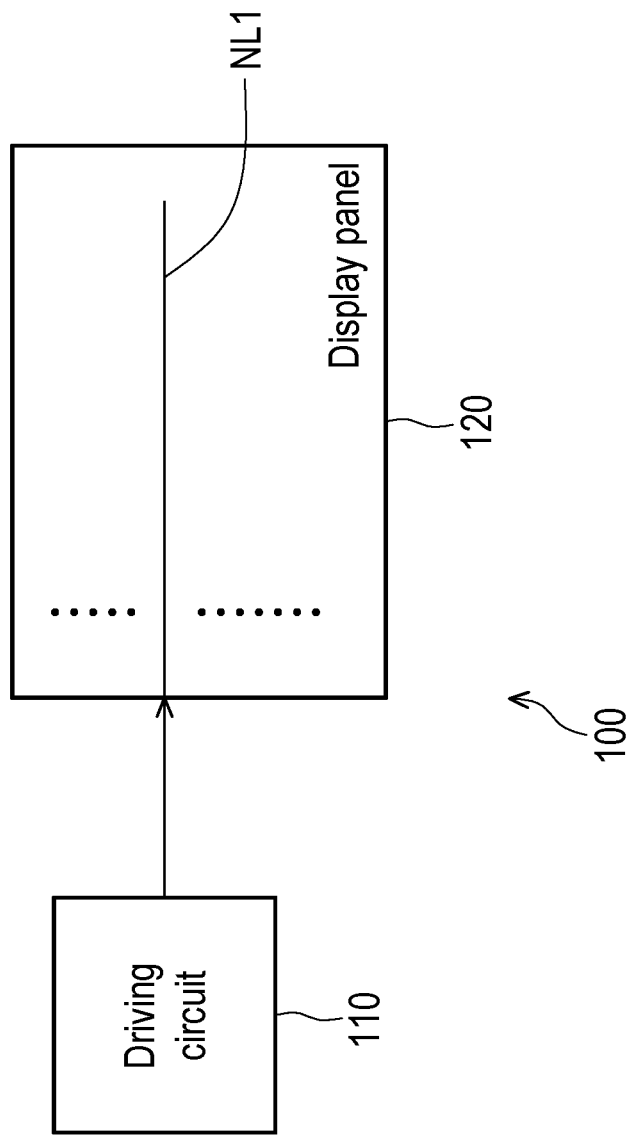
FIG. 1 is a schematic circuit block diagram of a display device according to an embodiment of the disclosure.

The term "coupled (or connected)" used throughout the specification of the disclosure (including the appended claims) may refer to any direct or indirect means of connection. For example, if it is described that the first device is coupled (or connected) to the second device, it should be interpreted that the first device may be directly connected to the second device, or the first device may be connected indirectly to the second device through other devices or some kind of connection means. The terms "first" and "second" mentioned throughout the specification of the disclosure (including the appended claims) are used to name the name of an element, or to distinguish different embodiments or ranges, and are not used to limit the upper limit or the lower limit of the number of elements, and are not to limit the order of elements either. In addition, wherever possible, elements/members/steps using the same reference numerals in the drawings and embodiments represent the same or similar parts. For the elements/members/steps using the same reference numerals or using the same terms, reference may be made to the related descriptions in different embodiments.

FIG. 1 is a schematic circuit block diagram of a display device 100 according to an embodiment of the disclosure. The display device 100 shown in FIG. 1 includes a driving circuit 110 and a display panel 120. This embodiment does not limit the implementation details of the display panel 120. Based on the actual design, the display panel 120 may include a liquid-crystal display (LCD) panel or other display panels. The display panel 120 has one or more native conductive lines (e.g., a native conductive line NL1 shown in FIG. 1) for performing a display driving operation. For example, the native conductive line may include a gate line (or referred to as a scan line), a source line (or referred to as a data line), and/or other transmission lines. These native conductive lines are configured to perform the display driving operation. In addition, some (or all) of these native conductive lines can also be configured to perform a heating operation.

Figure 2:
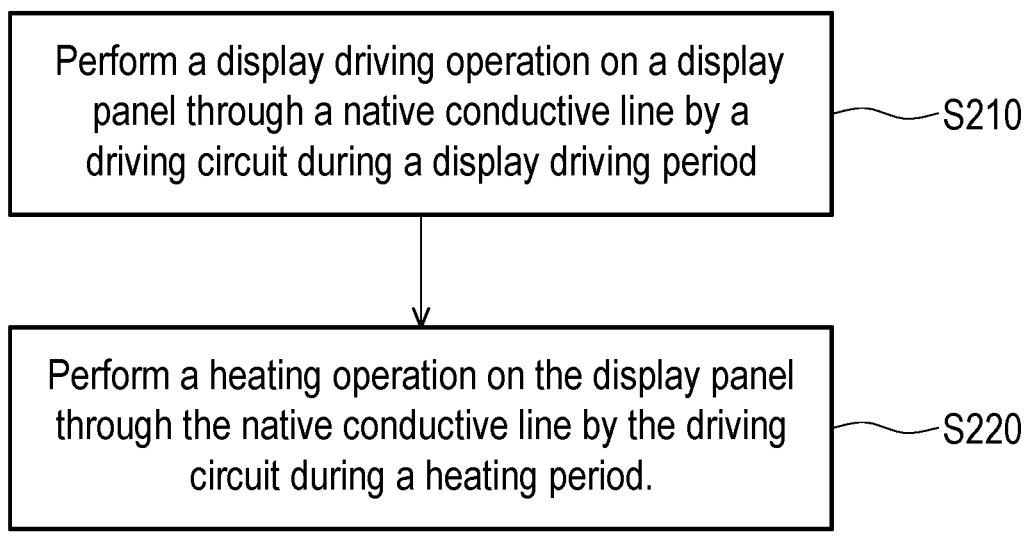
FIG. 2 is a schematic flowchart of an operation method of the display device according to an embodiment of the disclosure.

FIG. 2 is a schematic flowchart of an operation method of the display device according to an embodiment of the disclosure. Please refer to FIG. 1 and FIG. 2. The driving circuit 110 is coupled to one or more native conductive lines (e.g., the native conductive line NL1) of the display panel 120. During a display driving period, the driving circuit 110 may perform the display driving operation on the display panel 120 through the native conductive line (Step S210). This embodiment does not limit the implementation details of the display driving operation. Based on the actual design, the display driving operation may include a well-known display driving operation or other display driving operations.

During a heating period, the driving circuit 110 may perform the heating operation on the display panel 120 through the native conductive line (Step S220). For example, the driving circuit 110 may apply different voltages to two terminals of the native conductive line NL1, that is, apply a certain heating voltage difference $\Delta V$ to the two terminals of the native conductive line NL1, so that a heating current passes through the native conductive line NL1. Since the native conductive line NL1 has a parasitic resistance, the heating current can make the native conductive line NL1 heat up. The heat generation characteristic of the native conductive line NL1 is shown in the following Formula (1). Q is the heat emitted by the native conductive line NL1, P is the power consumed by the native conductive line NL1, T is time, $\Delta V$ is the heating voltage difference applied to the two terminals of the native conductive line NL1, R is the parasitic resistance value of the native conductive line NL1. It may be seen from the Formula (1) that when there is a voltage difference between the two terminals of the native conductive line NL1, the native conductive line NL1 can generate heat, thereby heating up the display panel 120.

$$Q = P \times T = [(\Delta V^{\wedge}2)/R] \times T \quad \text{Formula (1)}$$

Based on the above, the driving circuit 110 described in this embodiment can perform the display driving operation during the display driving period by using the native conductive line NL1. This embodiment does not limit the actual implementation of the display driving period. For example, based on the actual design, the display driving period may be a well-known display driving period. In addition, the driving circuit 110 may also perform the heating operation during the heating period by using the native conductive line NL1. This embodiment does not limit the actual implementation of the heating period. For example, based on the actual design, the heating period may be outside the display driving period. In some actual design examples, the heating period may be within a vertical porch period (a period that is not of a display operation or a touch operation) or a vertical blanking period. Therefore, the display device 100 can increase the temperature of the display panel 120 without using an additional heating device.

Figure 3:
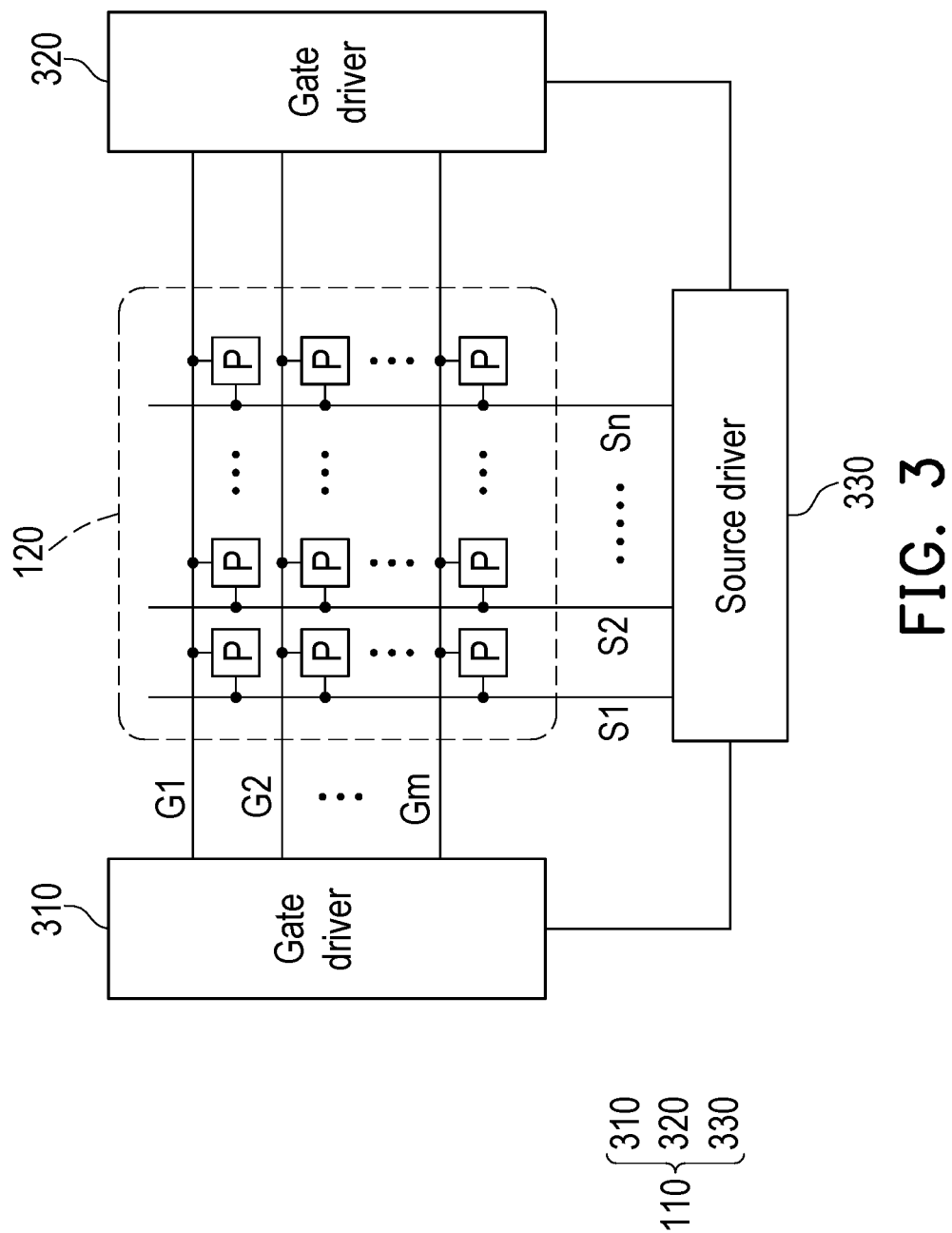
FIG. 3 is a schematic circuit block diagram of a driving circuit and a display panel according to an embodiment of the disclosure.

FIG. 3 is a schematic circuit block diagram of the driving circuit 110 and the display panel 120 according to an embodiment of the disclosure. The driving circuit 110 and the display panel 120 shown in FIG. 3 may be used as one of many implementation examples of the driving circuit 110 and the display panel 120 shown in FIG. 1. In the embodiment shown in FIG. 3, the native conductive line of the display panel 120 may include multiple gate lines (or referred to as scan lines, such as gate lines G1, G2, ..., Gm shown in FIG. 3) and multiple source lines (or referred to as data lines, such as source lines S1, S2, ..., Sn shown in FIG. 3). The driving circuit 110 may include a gate driver 310, a gate driver 320, and a source driver 330. The source driver 330 may have a timing controller function. Based on the timing control of the source driver 330, the gate drivers 310 and 320 may jointly perform a scanning operation in the display driving operation on the gate lines G1 to Gm during the display driving period. Based on the scan timing of the gate drivers 310 and 320, the source driver 330 may perform a gray scale driving operation in the display driving operation on the source lines S1 to Sn during the display driving period, so as to write a gray scale voltage into different pixel circuits P of the display panel 120.

Figure 4:
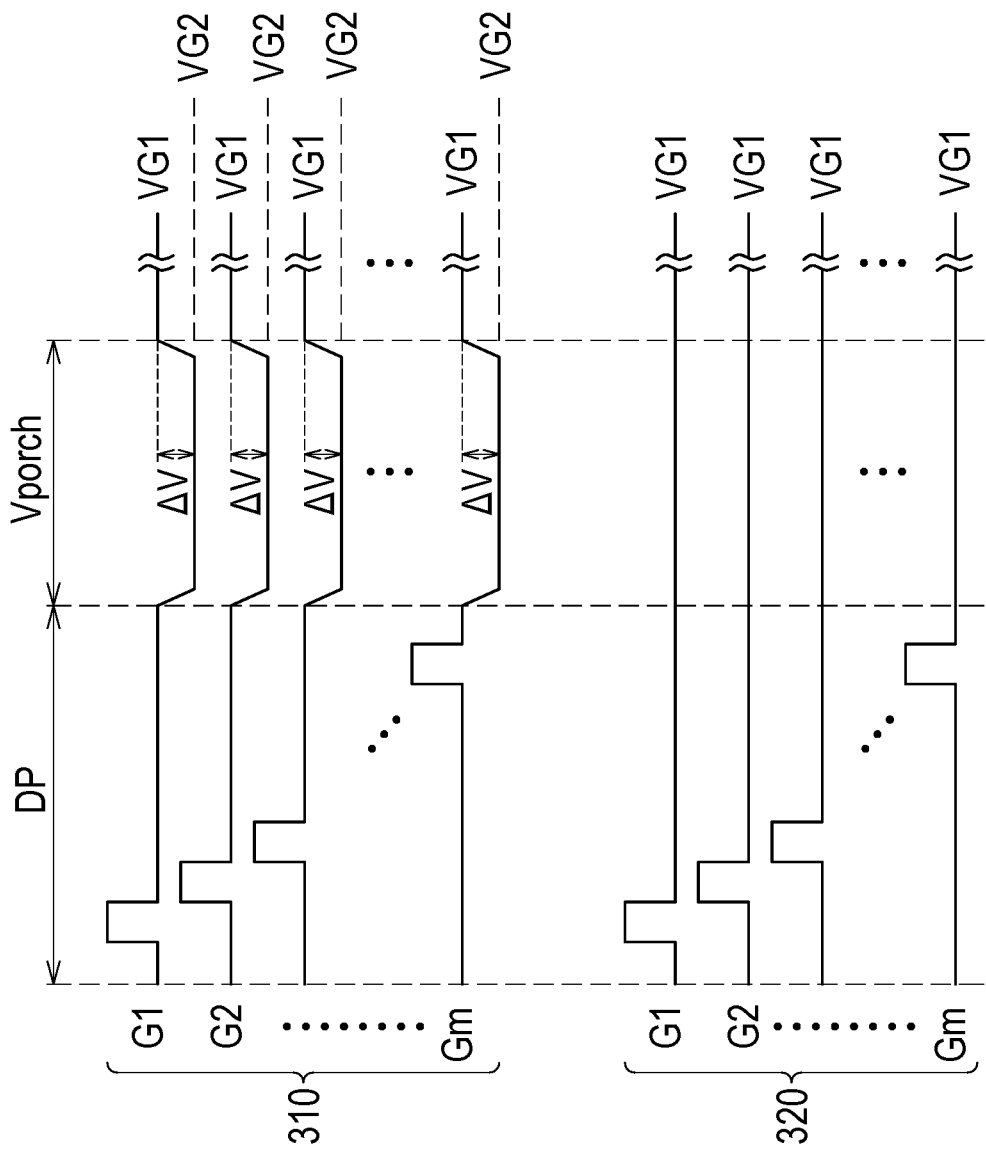
FIG. 4 is a schematic driving waveform diagram of a gate driver performing a driving operation on a gate line according to an embodiment of the disclosure.

FIG. 4 is a schematic driving waveform diagram of the gate drivers 310 and 320 performing the driving operation on the gate lines G1 to Gm according to an embodiment of the disclosure. The horizontal axis in FIG. 4 represents time. Please refer to FIG. 3 and FIG. 4. The upper part of FIG. 4 shows the driving waveform of the driving operation performed by the gate driver 310 on terminals of the gate lines G1 to Gm, and the lower part of FIG. 4 shows the driving waveform of the driving operation performed by the gate driver 320 on the other terminals of the gate lines G1 to Gm.

The gate driver 310 is coupled to terminals of the gate lines G1 to Gm (e.g., first terminals). The gate driver 320 is coupled to the other terminals of the gate lines G1 to Gm (e.g., second terminals). The gate drivers 310 and 320 may jointly perform the scanning operation on the gate lines G1 to Gm during a display driving period DP, as shown in FIG. 4. In the embodiment shown in FIG. 4, the heating period may be within a vertical porch period Vporch. During the vertical porch period Vporch (the heating period), the gate drivers 310 and 320 may jointly apply the certain heating voltage difference $\Delta V$ to the two terminals of each (the native conductive line NL1) of the gate lines G1 to Gm to perform the heating operation on the display panel 120. During the heating period, the voltage applied by the gate drivers 310 and 320 to the gate lines G1 to Gm in order to heat the display panel 120 is not enough to turn on any pixel circuit P coupled to the gate lines G1 to Gm.

For example (but not limited thereto), the gate driver 310 pulls down the voltages at the first terminals of the gate lines G1 to Gm from a voltage level VG1 to a voltage level VG2 during the vertical porch period Vporch, and the gate driver 320 maintains voltages of the second terminals of the gate lines G1 to Gm at the voltage level VG1 during the vertical porch period Vporch. Therefore, the two terminals of each of the gate lines G1 to Gm have the heating voltage difference $\Delta V = VG1 - VG2$. The gate drivers 310 and 320 apply the heating voltage difference $\Delta V$ to the two terminals of each of the gate lines G1 to Gm, so that the heating current passes through the gate lines G1 to Gm. Since the gate line has the parasitic resistance, the heating current can make the gate lines G1 to Gm heat up. Therefore, the gate drivers 310 and 320 can perform the heating operation on the display panel 120 through the gate lines G1 to Gm during the heating period.

Figure 5:
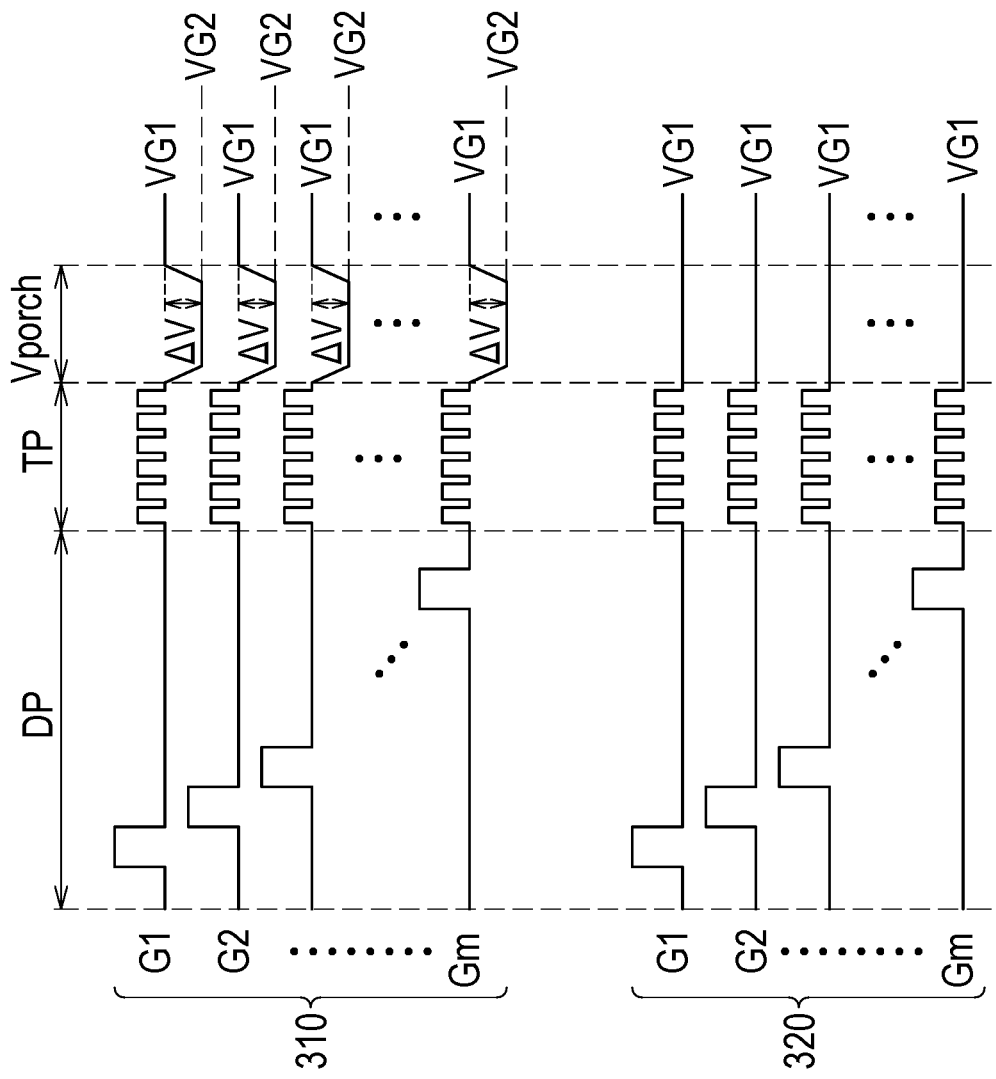
FIG. 5 is a schematic driving waveform diagram of a gate driver performing a driving operation on a gate line according to another embodiment of the disclosure.

FIG. 5 is a schematic driving waveform diagram of the gate drivers 310 and 320 performing the driving operation on the gate lines G1 to Gm according to another embodiment of the disclosure. The horizontal axis in FIG. 5 represents time. In the embodiment shown in FIG. 5, the driving circuit 110 also performs a touch detection operation on the display panel 120 through the one or more native conductive lines during a touch detection period TP. Please refer to FIG. 3 and FIG. 5. The gate driver 310 is coupled to the terminals of the gate lines G1 to Gm (e.g., the first terminals). The gate driver 320 is coupled to the other terminals of the gate lines G1 to Gm (e.g., the second terminals). The upper part of FIG. 5 shows the driving waveform of the driving operation performed by the gate driver 310 on the first terminals of the gate lines G1 to Gm, and the lower part of FIG. 5 shows the driving waveform of the driving operation performed by the gate driver 320 on the second terminals of the gate lines G1 to Gm. The gate drivers 310 and 320 may jointly perform the scanning operation on the gate lines G1 to Gm during the display driving period DP, and jointly perform LFD (Load Free Driving, i.e. the touch detection operation) on the display panel 120 through the gate lines G1 to Gm during the touch detection period TP, as shown in FIG. 5.

In the embodiment shown in FIG. 5, the heating period may be outside the display driving period DP and the touch detection period TP. For example, the heating period may be within the vertical porch period Vporch or the vertical blanking period. During the vertical porch period Vporch (the heating period), the gate driver 310 and 320 may jointly apply the certain heating voltage difference ΔV to the two terminals of each of the gate lines G1 to Gm (the native conductive line NL1) to perform the heating operation on the display panel 120. For the heating operation of the vertical porch period Vporch shown in FIG. 5, reference may be made to the relevant description of the heating operation of the vertical porch period Vporch shown in FIG. 4, so details are not repeated here.

Figure 6:
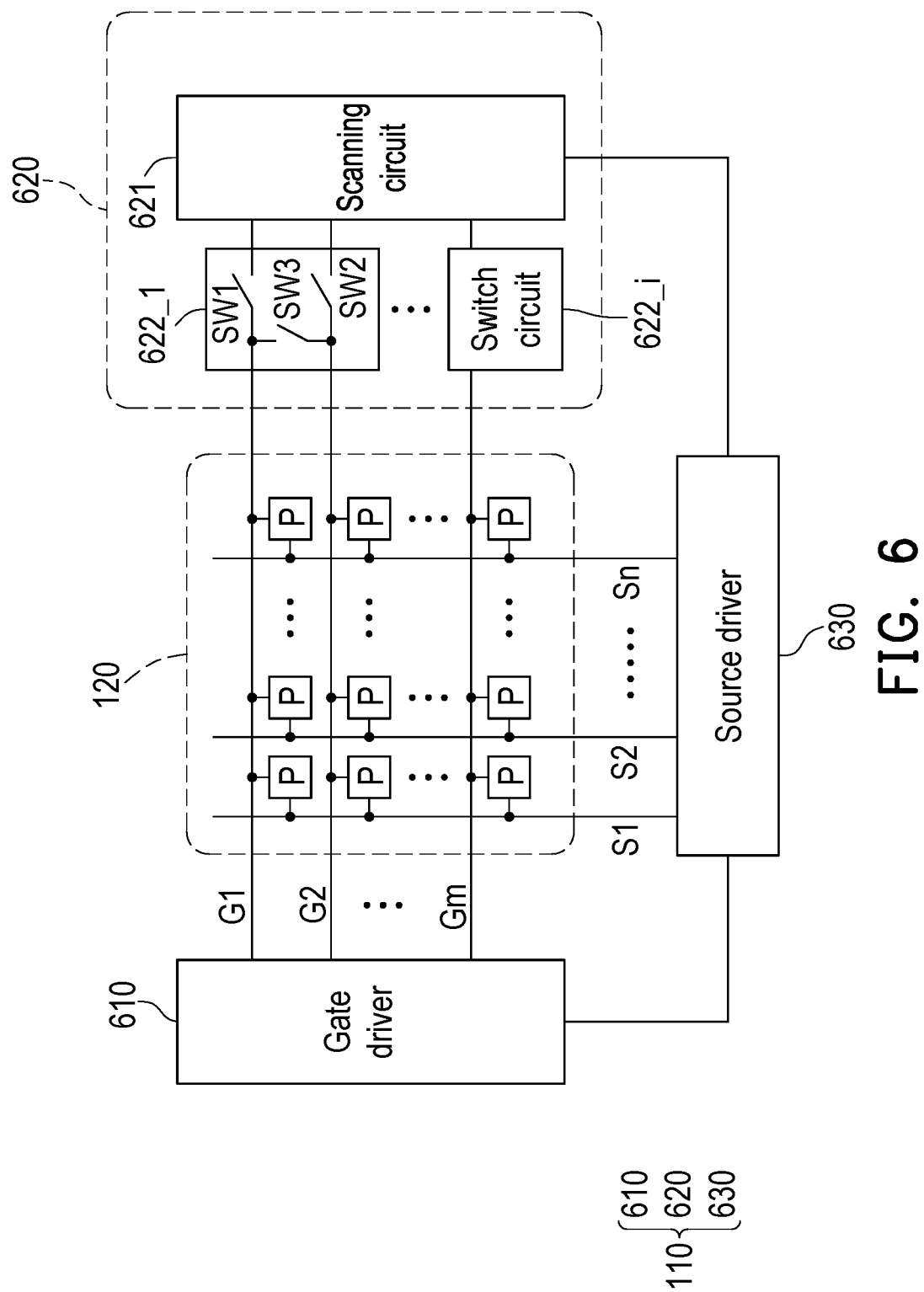
FIG. 6 is a schematic circuit block diagram of a driving circuit according to another embodiment of the disclosure.

FIG. 6 is a schematic circuit block diagram of the driving circuit 110 according to another embodiment of the disclosure. For the display panel 120 shown in FIG. 6, reference may be made to the relevant description of the display panel 120 shown in FIG. 3, so details are not repeated here. The driving circuit 110 shown in FIG. 6 may be used as one of many implementation examples of the driving circuit 110 shown in FIG. 1. In the embodiment shown in FIG. 6, the driving circuit 110 may include a gate driver 610, a gate driver 620, and a source driver 630. For the source driver 630 shown in FIG. 6, reference may be made to the relevant description of the source driver 330 shown in FIG. 3, for the operation of the gate drivers 610 and 620 during the display driving period shown in FIG. 6, reference may be made to the relevant descriptions of the gate drivers 310 and 320 shown in FIG. 3, so details are not repeated here. Based on the timing control of the source driver 630, the gate drivers 610 and 620 may jointly perform the scanning operation on the gate lines G1 to Gm during the display driving period. Based on the scan timing of the gate drivers 610 and 620, the source driver 630 may perform the gray scale driving operation on the source lines S1 to Sn during the display driving period, so as to write the gray scale voltage into the different pixel circuits P of the display panel 120.

In the embodiment shown in FIG. 6, the gate driver 620 may include a scanning circuit 621 and switch circuits 622_1 to 622_i. For other switch circuits (such as the switch circuit 622_i) in the gate driver 620, reference may be made to the relevant description of the switch circuit 622_1 and make analogies. In the embodiment shown in FIG. 6, the switch circuit 622_1 includes a switch SW1, a switch SW2, and a switch SW3. During the display driving period, the switch SW1 and the switch SW2 are turned on and the switch SW3 is turned off, so the gate driver 610 and the scanning circuit 621 may jointly perform the scanning operation on the gate lines G1 and G2.

During the heating period, the switch SW1 and the switch SW2 are turned off and the switch SW3 is turned on, so the gate driver 620 may couple the second terminal of the gate line G1 to the second terminal of the gate line G2. During the heating period, the gate driver 610 may apply the heating voltage difference ΔV to the first terminal of the gate line G1 and the first terminal of the gate line G2, in which the voltage applied by the gate driver 610 to the gate lines G1 and G2 in order to heat the display panel 120 during the heating period is not enough to turn on the pixel circuit P coupled to the gate lines G1 and G2. For example (but not limited thereto), the gate driver 310 pulls down the voltage at the first terminal of the gate line G1 from the voltage level VG1 to the voltage level VG2 during the heating period (such as the vertical porch period Vporch), and maintains the voltage of the first terminal of the gate line G2 at the voltage level VG1. Therefore, the heating current passes through the gate lines G1 and G2. Since the gate line has the parasitic resistance, the heating current can make the gate lines G1 and G2 heat up, thereby performing the heating operation on the display panel 120. In the same way, by adding a switch circuit into the gate driver 610, the switch circuit can connect three or more gate lines during the heating period to heat the display panel 120.

Figure 7:
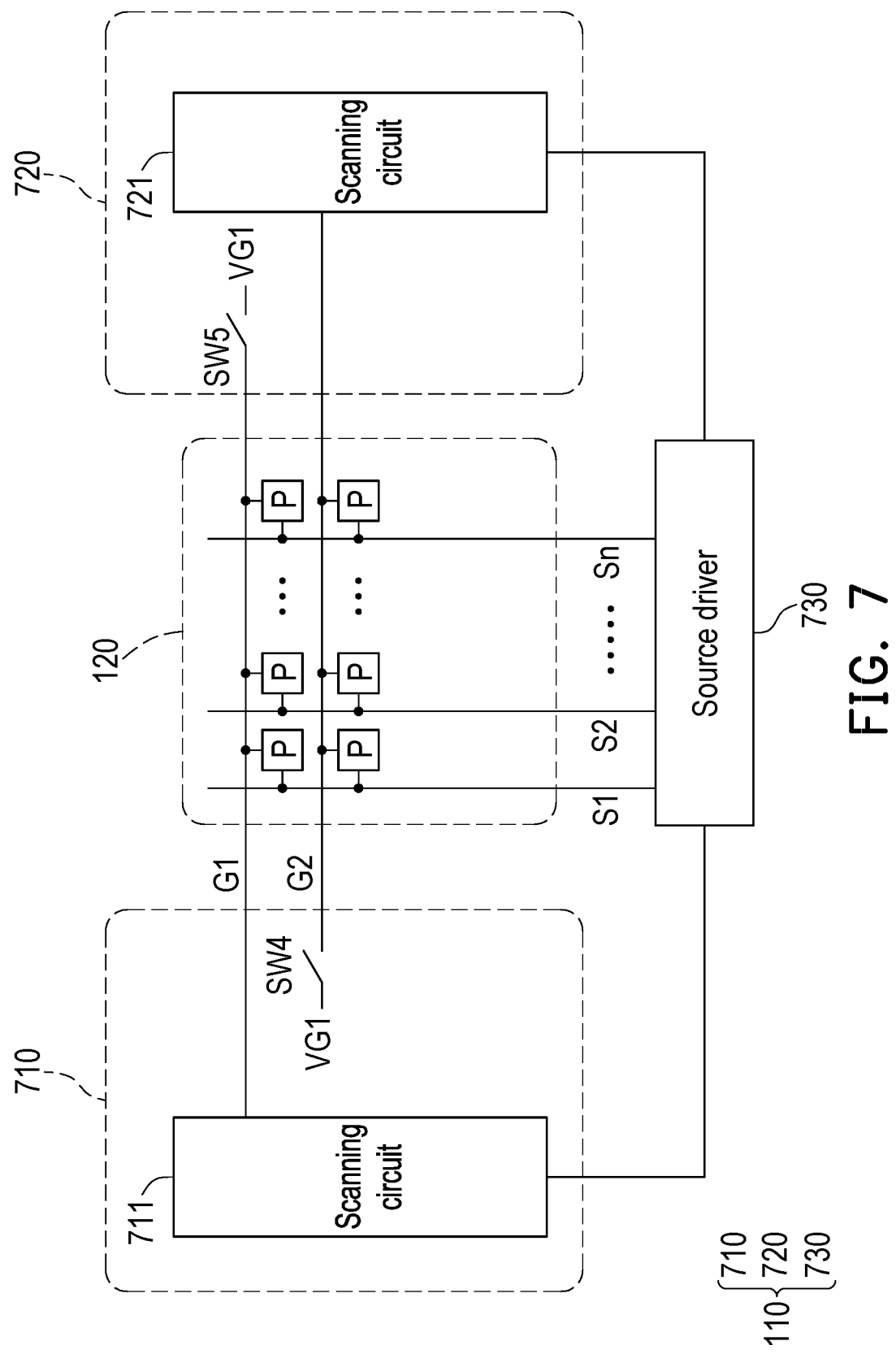
FIG. 7 is a schematic circuit block diagram of a driving circuit according to still another embodiment of the disclosure.

FIG. 7 is a schematic circuit block diagram of the driving circuit 110 according to still another embodiment of the disclosure. For the display panel 120 shown in FIG. 7, reference may be made to the relevant description of the display panel 120 shown in FIG. 3, so details are not repeated here. The driving circuit 110 shown in FIG. 7 may be used as one of many implementation examples of the driving circuit 110 shown in FIG. 1. In the embodiment shown in FIG. 7, the driving circuit 110 may include a gate driver 710, a gate driver 720, and a source driver 730. For the source driver 730 shown in FIG. 7, reference may be made to the relevant description of the source driver 330 shown in FIG. 3, so details are not repeated here. The operation of the gate drivers 710 and 720 on the gate lines G1 and G2 will be described below with specific examples. For operations of the gate driver 710 and 720 on other gate lines of the display panel 120, reference may be made to the relevant descriptions of the gate lines G1 and G2 and make analogies.

The gate driver 710 is coupled to the first terminal of the gate line G1 and the first terminal of the gate line G2, and the gate driver 720 is coupled to the second terminal of the gate line G1 and the second terminal of the gate line G2. In the embodiment shown in FIG. 7, the gate driver 710 includes a scanning circuit 711 and a switch SW4, and the gate driver 720 includes a scanning circuit 721 and a switch SW5. The scanning circuit 711 is coupled to the first terminal of the gate line G1. The first terminal of the switch SW4 receives the voltage level VG1. The second terminal of the switch SW4 is coupled to the first terminal of the gate line G2. The first terminal of the switch SW5 receives the voltage level VG1. The second terminal of the switch SW5 is coupled to the second terminal of the gate line G1. The scanning circuit 721 is coupled to the second terminal of the gate line G2.

During the display driving period, the switch SW4 and the switch SW5 are turned off. Based on the timing control of the source driver 730, during the display driving period, the scanning circuit 711 of the gate driver 710 may perform a first scanning operation on an odd-numbered gate line (such as the gate line G1) among the gate lines G1 to Gm, and the scanning circuit 721 of the gate driver 720 may perform a second scanning operation on an even-numbered gate line (such as the gate line G2) among the gate lines G1 to Gm. Based on the scan timing of the scanning circuits 711 and 721, the source driver 730 may perform the gray scale driving operation on the source lines S1 to Sn during the display driving period, so as to write the gray scale voltage into the different pixel circuits P of the display panel 120.

During the heating period (such as the vertical porch period Vporch), the switch SW4 and the switch SW5 are turned on, so the voltage level VG1 is applied to the second terminal of the gate line G1 and the first terminal of the gate line G2. The scanning circuit 711 may pull down the voltage at the first terminal of the gate line G1 from the voltage level VG1 to the voltage level VG2 during the heating period, so the gate drivers 710 and 720 jointly apply the heating voltage difference ΔV to the two terminals of the gate line G1 to perform the heating operation on the display panel 120. In addition, the scanning circuit 721 may pulls down the voltage at the second terminal of the gate line G2 from the voltage level VG1 to the voltage level VG2 during the heating period, so the gate drivers 710 and 720 jointly apply the heating voltage difference ΔV to the two terminals of the gate line G2 to perform the heating operation on the display panel 120. During the heating period, the voltage applied to the gate line G1 and the voltage applied to the gate line G2 by the gate drivers 710 and 720 in order to heat the display panel 120 are not enough to turn on the pixel circuits P coupled to the gate lines G1 and G2.

Figure 8:
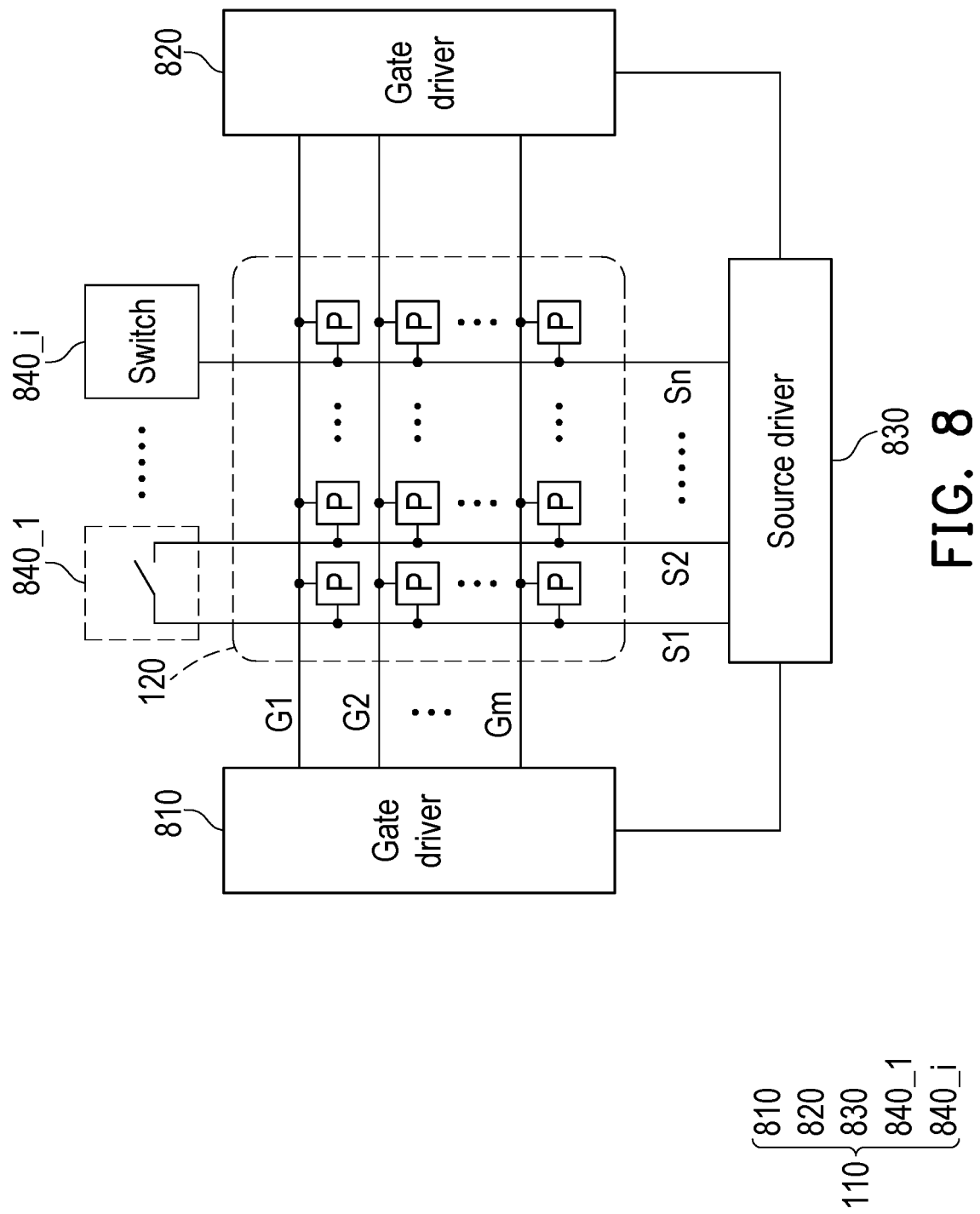
FIG. 8 is a schematic circuit block diagram of a driving circuit according to yet another embodiment of the disclosure.

FIG. 8 is a schematic circuit block diagram of the driving circuit 110 according to yet another embodiment of the disclosure. For the display panel 120 shown in FIG. 8, reference may be made to the related description of the display panel 120 shown in FIG. 3, so details are not repeated here. The driving circuit 110 shown in FIG. 8 may be used as one of many implementation examples of the driving circuit 110 shown in FIG. 1. In the embodiment shown in FIG. 8, the driving circuit 110 may include a gate driver 810, a gate driver 820, a source driver 830, and a plurality of switches (such as switches 840_1 to 840_j as shown in FIG. 8). For the display driving operation of the gate driver 810, the gate driver 820, and the source driver 830 on the display panel 120 shown in FIG. 8, reference may be made to the relevant descriptions of the gate driver 310, the gate driver 320, and the source driver 330 shown in FIG. 3, so details are not repeated here. Based on the timing control of the source driver 830, the gate drivers 810 and 820 may jointly perform the scanning operation on the gate lines G1 to Gm during the display driving period. Based on the scan timing of the gate drivers 810 and 820, the source driver 830 may perform the gray scale driving operation on the source lines S1 to Sn during the display driving period, so as to write the gray scale voltage into the different pixel circuits P of the display panel 120.

Figure 9:
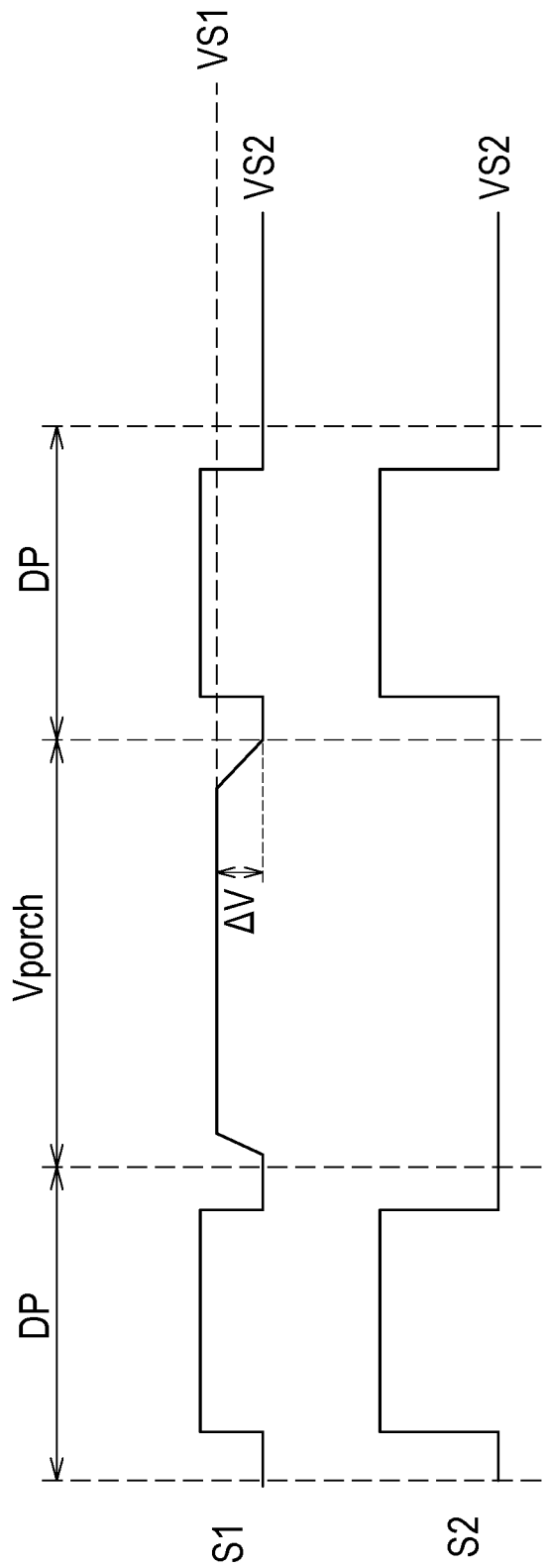
FIG. 9 is a schematic driving waveform diagram of a source driver performing a driving operation on a source line according to an embodiment of the disclosure.

FIG. 9 is a schematic driving waveform diagram of the source driver 830 performing the driving operation on the source lines S1 and S2 according to an embodiment of the disclosure. The horizontal axis in FIG. 9 represents time. Please refer to FIG. 8 and FIG. 9. For other switches in the driving circuit 110 (such as the switch 840_j), reference may be made to the relevant description of the switch 840_1 and make analogies, and for other source lines of the display panel 120 (such as the source line Sn), reference may be made to the relevant descriptions of the source lines S1 and S2 and make analogies. The source driver 830 is coupled to the first terminal of the source line S1 and the first terminal of the source line S2. The first terminal and the second terminal of the switch 840_1 are respectively coupled to the second terminal of the source line S1 and the second terminal of the source line S2. During the display driving period DP, the switch 840_1 is turned off, so based on the scan timing of the gate drivers 810 and 820, the source driver 830 may perform the gray scale driving operation on the source lines S1 and S2, so as to write the gray scale voltage into the different pixel circuits P of the display panel 120.

In the embodiment shown in FIG. 9, the heating period may be within the vertical porch period Vporch. During the vertical porch period Vporch (the heating period), the switch 840_1 is turned on, so that the second terminal of the source line S1 is coupled to the second terminal of the source line S2. At this time, the source driver 830 may apply the certain heating voltage difference ΔV to the first terminal of the source line S1 and the first terminal of the source line S2 to perform the heating operation on the display panel 120.

For example (but not limited thereto), the source driver 830 pulls up the voltage of the first terminal of the source line S1 from the voltage level VG2 to the voltage level VG1 during the vertical porch period Vporch, and the source driver 830 maintains the voltage of the first terminal of the source line S2 at the voltage level VG2 during the vertical porch period Vporch. Therefore, the source lines S1 and S2 have the heating voltage difference ΔV=VG1−VG2, so that the heating current passes through the source lines S1 and S2. Since the source line has the parasitic resistance, the heating current can make the source lines S1 and S2 heat up. Therefore, the source driver 830 may perform the heating operation on the display panel 120 through the source lines S1 and S2 (the native conductive line NL1) during the heating period.

Figure 10:
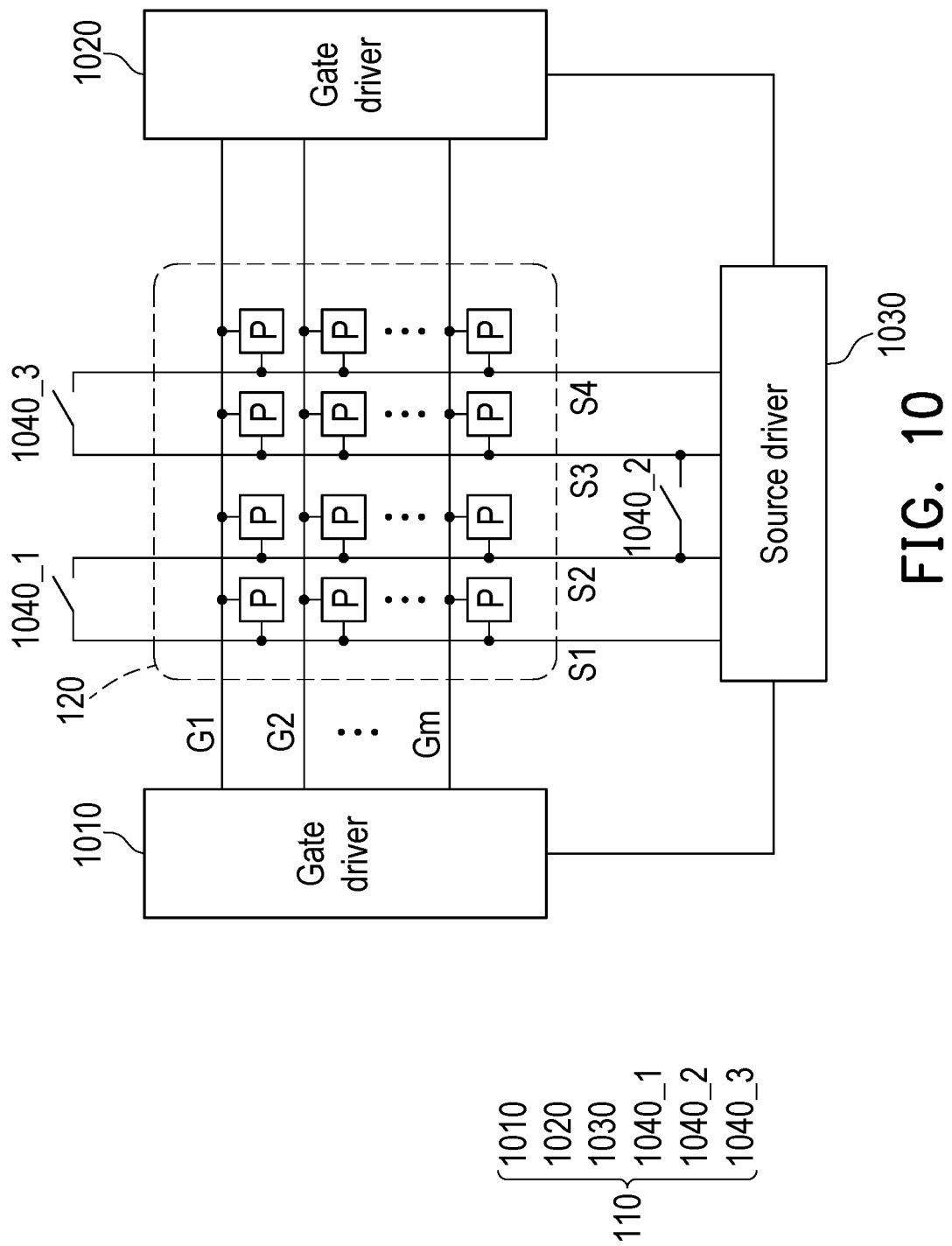
FIG. 10 is a schematic circuit block diagram of a driving circuit according to further another embodiment of the disclosure.

FIG. 10 is a schematic circuit block diagram of the driving circuit 110 according to further another embodiment of the disclosure. For the display panel 120 shown in FIG. 10, reference may be made to the relevant description of the display panel 120 shown in FIG. 3, so details are not repeated here. The driving circuit 110 shown in FIG. 10 may be used as one of many implementation examples of the driving circuit 110 shown in FIG. 1. In the embodiment shown in FIG. 10, the driving circuit 110 may include a gate driver 1010, a gate driver 1020, a source driver 1030, and a plurality of switches (such as switches 1040_1, 1040_2, and 1040_3 as shown in FIG. 8). For the display driving operation of the gate driver 1010, the gate driver 1020, and the source driver 1030 on the display panel 120 shown in FIG. 10, reference may be made to the relevant descriptions of the gate driver 310, the gate driver 320, and the source driver 330 shown in FIG. 3, or reference may be made to the relevant descriptions of the gate driver 810, the gate driver 820, and the source driver 830 shown in FIG. 8, so details are not repeated here. Based on the timing control of the source driver 1030, the gate drivers 1010 and 1020 may jointly perform the scanning operation on the gate lines G1 to Gm during the display driving period DP. Based on the scan timing of the gate drivers 1010 and 1020, the source driver 1030 may perform the gray scale driving operation on the source lines S1 to S4 during the display driving period DP, so as to write the gray scale voltage into the different pixel circuits P of the display panel 120.

The source driver 1030 is coupled to the first terminal of the source line S1, the first terminal of the source line S2, the first terminal of the source line S3, and the first terminal of the source line S4. The first terminal and the second terminal of the switch 1040_1 are respectively coupled to the second terminal of the source line S1 and the second terminal of the source line S2. The first terminal and the second terminal of the switch 1040_2 are respectively coupled to the first terminal of the source line S2 and the first terminal of the source line S3. The first terminal and the second terminal of the switch 1040_3 are respectively coupled to the second terminal of the source line S3 and the second terminal of the source line S4. During the display driving period DP, the switches 1040_1, 1040_2, and 1040_3 are turned off. At this time, the source driver 1030 may perform the gray scale driving operation on the source lines S1, S2, S3, and S4, so as to write the gray scale voltage into the different pixel circuits P of the display panel 120.

During the heating period (such as the vertical porch period Vporch), the switch 1040_1 is turned on to couple the second terminal of the source line S1 to the second terminal of the source line S2, and the switch 1040_2 is turned on to couple the first terminal of the source line S2 to the first terminal of the source line S3, and the switch 1040_3 is turned on to couple the second terminal of the source line S3 to the second terminal of the source line S4. At this time, the source driver 1030 may apply the certain heating voltage difference ΔV to the first terminal of the source line S1 and the first terminal of the source line S4 to perform the heating operation on the display panel 120. In the same way, by adding more switches 1040 into the driving circuit 110, the switches 1040 can connect five or more source lines during the heating period to heat the display panel 120.

In summary, the native conductive line NL1 according to the various embodiments is not merely configured to perform the display driving operation during the display driving period DP, but can also be configured to perform the heating operation during the heating period (such as the vertical porch period Vporch). Therefore, the display device 100 can increase the temperature of the display panel 120 without using an additional heating equipment.

Although the disclosure has been disclosed above as the embodiments, the embodiments are not used to limit the disclosure. Persons with ordinary knowledge in the technical field may make some changes and modifications without departing from the spirit and scope of the disclosure. Therefore, the protection scope of the disclosure shall be defined by the appended claims.

What is claimed is:

1. A display device, comprising:
a display panel having at least one native conductive line for performing a display driving operation; and
a driving circuit coupled to the at least one native conductive line, wherein the driving circuit performs the display driving operation on the display panel through the at least one native conductive line during a display driving period, and the driving circuit performs a heating operation on the display panel through the at least one native conductive line during a heating period,
wherein the driving circuit also performs a touch detection operation on the display panel through the at least one native conductive line during a touch detection period,
wherein the heating period is within a vertical porch period outside the display driving period and the touch detection period,
wherein the at least one native conductive line comprises a first source line, a second source line, a third source line, and a fourth source line of the display panel, and the driving circuit comprises:
a source driver coupled to a first terminal of the first source line, a first terminal of the second source line, a first terminal of the third source line, and a first terminal of the fourth source line, wherein,
during the display driving period, the source driver performs a gray scale driving operation of the display driving operation on the first source line, the second source line, the third source line, and the fourth source line; and
during the heating period, a second terminal of the first source line is coupled to a second terminal of the second source line, the first terminal of the second source line is coupled to the first terminal of the third source line, a second terminal of the third source line is coupled to a second terminal of the fourth source line, and the source driver applies a heating voltage difference to the first terminal of the first source line and the first terminal of the fourth source line to perform the heating operation on the display panel.

2. The display device as claimed in claim 1, wherein the driving circuit further comprises:
a first switch having a first terminal and a second terminal respectively coupled to a second terminal of the first source line and a second terminal of the second source line;
a second switch having a first terminal and a second terminal respectively coupled to the first terminal of the second source line and the first terminal of the third source line; and
a third switch having a first terminal and a second terminal respectively coupled to a second terminal of the third source line and a second terminal of the fourth source line, wherein,
during the display driving period, the first switch, the second switch, and the third switch are turned off; and
during the heating period, the first switch is turned on, so that the second terminal of the first source line is coupled to the second terminal of the second source line, the second switch is turned on, so that the first terminal of the second source line is coupled to the first terminal of the third source line, and the third switch is turned on, so that the second terminal of the third source line is coupled to the second terminal of the fourth source line.

3. An operation method of a display device, comprising:
performing a display driving operation on the display panel through at least one native conductive line of a display panel of the display device during a display driving period by a driving circuit of the display device;
performing a heating operation on the display panel through the at least one native conductive line during a heating period by the driving circuit; and
performing a touch detection operation on the display panel through the at least one native conductive line during a touch detection period by the driving circuit,
wherein the heating period is within a vertical porch period outside the display driving period and the touch detection period,
wherein the at least one native conductive line comprises a first source line, a second source line, a third source line, and a fourth source line of the display panel, and the driving circuit comprises a source driver coupled to a first terminal of the first source line, a first terminal of the second source line, a first terminal of the third source line, and a first terminal of the fourth source line;

performing a gray scale driving operation of the display driving operation on the first source line, the second source line, the third source line, and the fourth source line by the source driver during the display driving period;

during the heating period, coupling a second terminal of the first source line to a second terminal of the second source line, coupling the first terminal of the second source line to the first terminal of the third source line, coupling a second terminal of the third source line to a second terminal of the fourth source line; and applying a heating voltage difference to the first terminal of the first source line and the first terminal of the fourth source line to perform the heating operation on the display panel by the source driver during the heating period.

4. The operation method as claimed in claim 3, wherein the driving circuit further comprises a first switch, a second switch, and a third switch, a first terminal and a second terminal of the first switch are respectively coupled to a second terminal of the first source line and a second terminal of the second source line, a first terminal and a second terminal of the second switch are respectively coupled to the first terminal of the second source line and the first terminal of the third source line, a first terminal and a second terminal of the third switch are respectively coupled to a second terminal of the third source line and a second terminal of the fourth source line, and the operation method further comprises:

turning off the first switch, the second switch, and the third switch during the display driving period;

turning on the first switch to couple the second terminal of the first source line to the second terminal of the second source line during the heating period;

turning on the second switch to couple the first terminal of the second source line to the first terminal of the third source line during the heating period; and turning on the third switch to couple the second terminal of the third source line to the second terminal of the fourth source line during the heating period.

* * * * *